US012584475B2

(12) United States Patent
Sugano et al.

(10) Patent No.: US 12,584,475 B2
(45) Date of Patent: Mar. 24, 2026

(54) OIL PRESSURE SUPPLY DEVICE

(71) Applicants: JATCO Ltd, Fuji (JP); NISSAN MOTOR CO., LTD., Yokohama (JP)

(72) Inventors: Tomoko Sugano, Yokohama (JP); Takurou Kawasumi, Ebina (JP)

(73) Assignees: JATCO Ltd, Fuji (JP); NISSAN MOTOR CO., LTD., Yokohama (JP)

( * ) Notice: Subject to any disclaimer, the term of this patent is extended or adjusted under 35 U.S.C. 154(b) by 662 days.

(21) Appl. No.: 17/788,715

(22) PCT Filed: Dec. 8, 2020

(86) PCT No.: PCT/JP2020/045700
§ 371 (c)(1),
(2) Date: Jun. 23, 2022

(87) PCT Pub. No.: WO2021/131676
PCT Pub. Date: Jul. 1, 2021

(65) Prior Publication Data
US 2023/0026991 A1    Jan. 26, 2023

(30) Foreign Application Priority Data
Dec. 27, 2019    (JP) ................................. 2019-238015

(51) Int. Cl.
*F04B 49/03* (2006.01)
*F04B 7/02* (2006.01)
(Continued)

(52) U.S. Cl.
CPC ............ *F04B 49/03* (2013.01); *F04B 7/0266* (2013.01); *F16K 15/066* (2013.01); *F16K 25/005* (2013.01); *F16H 61/0031* (2013.01)

(58) Field of Classification Search
CPC ................. F16K 15/066; F16K 25/005; F16K 15/00–12; F16H 57/0435; F16H 61/0031;
(Continued)

(56) References Cited

U.S. PATENT DOCUMENTS

| | | | | |
|---|---|---|---|---|
| 4,462,277 A | * | 7/1984 | Miki | ................... F16H 61/6625 477/45 |
| 5,092,361 A | * | 3/1992 | Masuyama | ......... F16K 27/0209 251/368 |

(Continued)

FOREIGN PATENT DOCUMENTS

| | | | | |
|---|---|---|---|---|
| CA | 1080128 A | 6/1980 | | |
| CN | 104141807 A | * 11/2014 | ......... F16K 27/0209 |

(Continued)

*Primary Examiner* — Alexander B Comley
(74) *Attorney, Agent, or Firm* — Foley & Lardner LLP

(57) ABSTRACT

An oil pressure supply device supplies, to an oil chamber, an oil pressure generated by suctioning oil from an oil source with an oil pump. The oil pressure supply device includes a first oil passage connected to a suction side of the oil pump; a first check valve provided in the first oil passage and configured to close the first oil passage and prevent oil from moving to the oil source side when the oil pump is stopped; a second oil passage connected to a discharge side of the oil pump; and a second check valve provided in the second oil passage and configured to close the second oil passage and prevent oil from moving to the oil pump side when the oil pump is stopped. When the oil pump is stopped, the second check valve closes the second oil passage earlier than the first check valve closes the first oil passage.

7 Claims, 9 Drawing Sheets

(51) Int. Cl.
    *F16K 15/06*          (2006.01)
    *F16K 25/00*          (2006.01)
    *F16H 61/00*          (2006.01)

(58) Field of Classification Search
    CPC .............. F04C 2/084; F04C 2/101–102; F04C
                   15/066; F04B 7/0266; F04B 49/002;
                               F04B 49/03–035
    USPC ............................. 137/565.15; 417/280, 293
    See application file for complete search history.

(56)                References Cited

U.S. PATENT DOCUMENTS

| | | | |
|---|---|---|---|
| 5,251,442 A | 10/1993 | Roche | |
| 5,293,745 A | 3/1994 | Roche | |
| 5,700,226 A | 12/1997 | Droste | |
| 5,794,657 A * | 8/1998 | Oberg .................... B60K 15/03 | |
| | | | 137/538 |
| 5,802,490 A | 9/1998 | Droste | |
| 6,386,170 B1 | 5/2002 | Iwano et al. | |
| 8,312,863 B2 * | 11/2012 | Ibrahim .............. F02D 41/3082 | |
| | | | 417/326 |
| 8,381,766 B2 * | 2/2013 | Fennimore .............. C01B 3/065 | |
| | | | 137/565.11 |
| 8,500,600 B2 | 8/2013 | Moorman | |
| 9,835,140 B2 | 12/2017 | Henderson et al. | |
| 2011/0297258 A1 * | 12/2011 | Tanaka .................. F16H 37/082 | |
| | | | 137/565.11 |
| 2013/0260957 A1 | 10/2013 | Ueda et al. | |
| 2014/0060676 A1 * | 3/2014 | Wi ........................ F04B 49/002 | |
| | | | 137/565.01 |
| 2014/0060677 A1 * | 3/2014 | Wi ........................ F04B 49/002 | |
| | | | 137/565.01 |
| 2014/0060679 A1 * | 3/2014 | Wi .......................... F01M 1/16 | |
| | | | 137/565.3 |
| 2014/0064990 A1 * | 3/2014 | Jo ........................ F04B 49/002 | |
| | | | 417/253 |
| 2015/0113971 A1 * | 4/2015 | Morita .................... F15B 11/17 | |
| | | | 60/426 |
| 2015/0167832 A1 * | 6/2015 | Van Druten ........ F16H 61/0025 | |
| | | | 137/565.15 |
| 2015/0275929 A1 * | 10/2015 | Tsutsui .................... F15B 13/01 | |
| | | | 417/559 |
| 2017/0184157 A1 | 6/2017 | Fujii et al. | |

FOREIGN PATENT DOCUMENTS

| | | | | | |
|---|---|---|---|---|---|
| CN | 107387598 A | * | 11/2017 | .......... F16D 48/066 |
| CN | 206608537 U | * | 11/2017 | |
| CN | 206608538 U | * | 11/2017 | |
| CN | 206682282 U | * | 11/2017 | |
| CN | 206682283 U | * | 11/2017 | |
| CN | 207093614 U | | 3/2018 | |
| CN | 109139895 A | * | 1/2019 | |
| DE | 102016116952 A1 | * | 6/2017 | ......... F16H 57/0434 |
| EP | 1113205 B1 | * | 11/2005 | ............... F16F 1/06 |
| JP | S53-124830 A | | 10/1978 | |
| JP | 09303256 A | * | 11/1997 | ......... F16H 57/0434 |
| JP | 10115291 A | * | 5/1998 | |
| JP | 2001-193661 A | | 7/2001 | |
| JP | 3534814 B2 | * | 6/2004 | |
| JP | 2004-347016 A | | 12/2004 | |
| JP | 2005-186734 A | | 7/2005 | |
| JP | 2005-221047 A | | 8/2005 | |
| JP | 2005-233100 A | | 9/2005 | |
| JP | WO2005038321 A1 | * | 1/2007 | |
| JP | 2008-175326 A | | 7/2008 | |
| JP | 2010-215164 A | | 9/2010 | |
| JP | 2011-174413 A | | 9/2011 | |
| JP | 2012057758 A | * | 3/2012 | ......... F16H 61/0025 |
| JP | 2013024383 A | * | 2/2013 | |
| JP | 2013072496 A | * | 4/2013 | |
| JP | 5233956 B2 | * | 7/2013 | |
| JP | 2013-155756 A | | 8/2013 | |
| JP | 2013-212728 A | | 10/2013 | |
| JP | 2014-047917 A | | 3/2014 | |
| JP | 2014-047919 A | | 3/2014 | |
| JP | 2014-047920 A | | 3/2014 | |
| JP | 2014-047921 A | | 3/2014 | |
| JP | 2014-234909 A | | 12/2014 | |
| JP | 2015-054636 A | | 3/2015 | |
| JP | 2015-200369 A | | 11/2015 | |
| JP | 2015-224720 A | | 12/2015 | |
| JP | 2016079992 A | * | 5/2016 | |
| JP | 2017-032063 A | | 2/2017 | |
| JP | 2017-061966 A | | 3/2017 | |
| JP | 2017-116054 A | | 6/2017 | |
| JP | 6350567 B2 | * | 7/2018 | |
| JP | 2019215028 A | * | 12/2019 | |
| KR | 20150143846 A | * | 12/2015 | |
| KR | 20170047454 A | * | 5/2017 | |
| WO | WO-2013/146105 A1 | | 10/2013 | |
| WO | WO-2014/086968 A1 | | 6/2014 | |

* cited by examiner

OIL PRESSURE SUPPLY DEVICE

TECHNICAL FIELD

The present invention relates to an oil pressure supply device.

BACKGROUND ART

JP 2016-79992 A discloses an oil pressure supply device that supplies an oil pressure to an automatic transmission or the like. The oil pressure supply device includes two pumps, that is, a mechanical oil pump operated by an engine and an electric oil pump operated by a motor. The oil pressure supply device supplies an oil pressure by using the mechanical oil pump and the electric oil pump in combination or by switching between the mechanical oil pump and the electric oil pump in accordance with a traveling condition of a vehicle.

SUMMARY OF INVENTION

The electric oil pump suctions oil from an oil reservoir formed in an oil pan via an oil passage. When the electric oil pump is stopped and the suction of oil is stopped, the air that has entered through gaps between components or the air that has accumulated in a strainer that filters oil enters the oil passage, so that the oil leaks from the oil passage. As a result, when the electric oil pump is operated again, the electric oil pump may suction the air in the oil passage and idle until the air is discharged, which may result in delay of the discharge of the oil.

It is required to prevent air from entering the oil passage connecting the electric oil pump and the oil reservoir and to improve the responsiveness of the electric oil pump.

According to an aspect of the present invention, an oil pressure supply device for supplying, to an oil chamber, an oil pressure generated by suctioning oil from an oil source with an oil pump, is provided.

The oil pressure supply device includes:
- a first oil passage connected to a suction side of the oil pump;
- a first check valve provided in the first oil passage and configured to close the first oil passage and prevent oil from moving to the oil source side when the oil pump is stopped;
- a second oil passage connected to a discharge side of the oil pump; and
- a second check valve provided in the second oil passage and configured to close the second oil passage and prevent oil from moving to the oil pump side when the oil pump is stopped.

When the oil pump is stopped, the second check valve closes the second oil passage earlier than the first check valve closes the first oil passage.

According to the above aspect, it is possible to prevent air from entering the oil passage connecting the electric oil pump and the oil source, and to improve the responsiveness of the electric oil pump.

DESCRIPTION OF EMBODIMENTS

Hereinafter, an embodiment of the present invention will be described with reference to the drawings.

Figure 1:
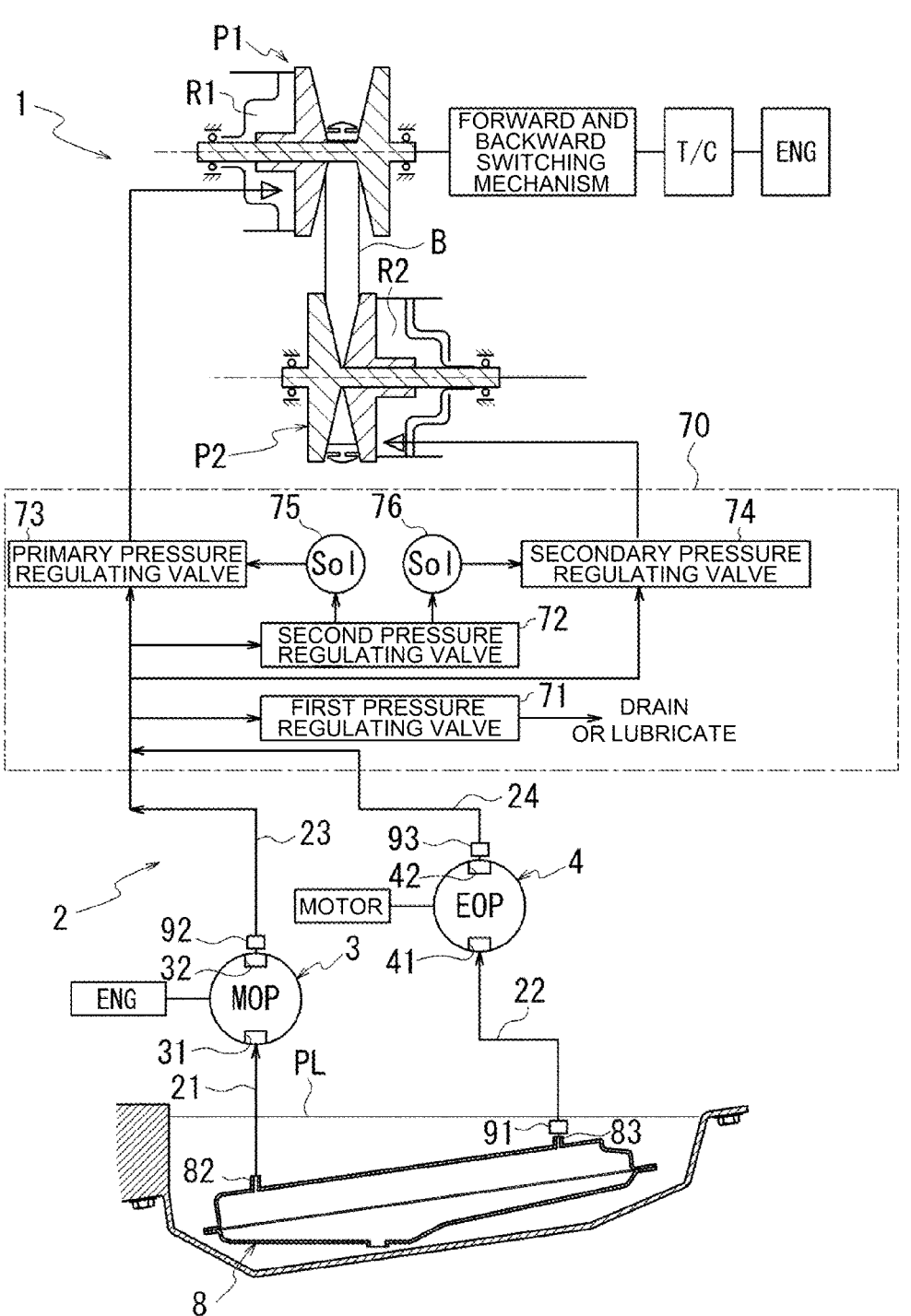
FIG. 1 is a schematic configuration diagram of a belt continuously variable transmission.

FIG. 1 is a schematic configuration diagram of a belt continuously variable transmission 1.

Figure 2:
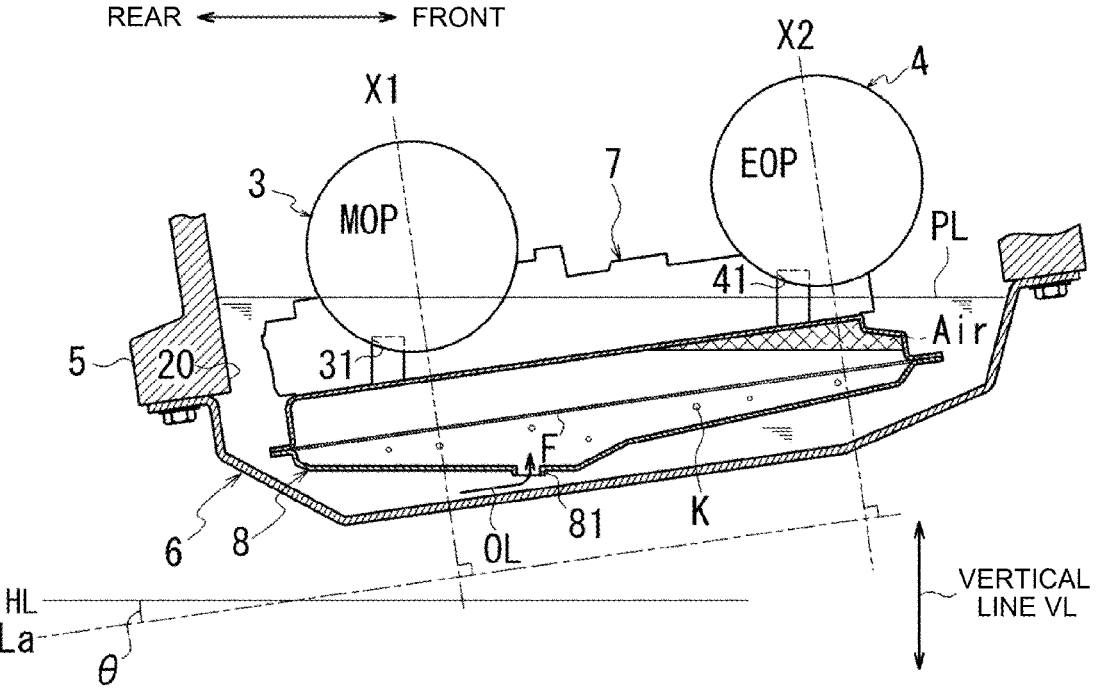
FIG. 2 is a diagram schematically showing a configuration of an oil pressure supply device.

FIG. 2 is a diagram schematically showing a configuration of an oil pressure supply device 2.

As shown in FIG. 1, the belt continuously variable transmission 1 for a vehicle includes, as a transmission mechanism, a pair of pulleys, i.e., a primary pulley P1 and a secondary pulley P2, and an endless belt B wound around the pair of pulleys.

In the belt continuously variable transmission 1, a speed ratio of rotation transmitted between the primary pulley P1 and the secondary pulley P2 is changed by changing winding radii of the belt B at the primary pulley P1 and the secondary pulley P2.

The winding radii of the belt B at the primary pulley P1 and the secondary pulley P2 are changed by regulating oil pressures supplied to an oil chamber R1 and an oil chamber R2 attached to the primary pulley P1 and the secondary pulley P2, respectively.

The belt continuously variable transmission 1 includes the oil pressure supply device 2. The oil pressure supply device 2 regulates, by a pressure regulating circuit 70, the oil pressure generated by a mechanical oil pump 3 and an electric oil pump 4, and supplies the regulated oil pressures to the oil chambers R1 and R2.

The mechanical oil pump 3 is an oil pump that is driven by rotation received from a vehicle drive source such as an engine. The mechanical oil pump 3 is switched between an operation and a stop in conjunction with an operation and a stop of the vehicle drive source. The electric oil pump 4 is driven by rotation received from a motor installed separately from the vehicle drive source. The operation and the stop of the electric oil pump 4 are switched by switching between the operation and the stop of the motor by a control device (not shown).

The electric oil pump 4 may be operated in place of the mechanical oil pump 3 when the mechanical oil pump 3 is stopped, for example, at the time of idling stop of the vehicle. Alternatively, the electric oil pump 4 may be operated in combination with the mechanical oil pump 3 when a high oil pressure is required due to a downshift of the belt continuously variable transmission 1 or the like.

As shown in FIG. 2, the belt continuously variable transmission 1 includes a transmission case 5 that houses a transmission mechanism, and an oil pan 6 that stores oil OL is provided at a lower portion of the transmission case 5 in a vertical line VL direction. The oil pan 6 covers a lower opening of the transmission case 5. An oil reservoir PL which is an oil source is formed in the oil pan 6, and the mechanical oil pump 3 and the electric oil pump 4 suction the oil OL from the oil reservoir PL.

Due to layout restrictions, the transmission case 5 is inclined such that a front end side of the transmission case is positioned above a rear end side of the transmission case in a front-rear direction of the vehicle. The oil pan 6 attached to the transmission case 5 is also inclined upward from a rear end side toward a front end side of the oil pan in the front-rear direction of the vehicle.

Inside the oil pan 6, a control valve body 7 is disposed in a state of being fixed to the lower portion of the transmission case 5. The pressure regulating circuit 70 (see FIG. 1) is built in the control valve body 7.

A strainer 8 is fixed to a lower portion of the control valve body 7. The strainer 8 includes a suction port 81 for the oil OL in a lower portion thereof, and includes a filter F for filtering the oil OL in an inner portion thereof.

The mechanical oil pump 3 and the electric oil pump 4 are installed at an upper portion of the strainer 8 in the vertical line VL direction. In FIG. 2, in order to make the positional relation easy to understand, the mechanical oil pump 3 and the electric oil pump 4 are schematically shown in a circular shape, and suction ports 31 and 41 shown in FIG. 2 are schematically shown with only positions thereof.

The mechanical oil pump 3 and the electric oil pump 4 are connected to oil passages 21 and 22 (see FIG. 1) provided inside the control valve body 7, respectively, and suction the oil OL stored in the oil pan 6 via the strainer 8.

The mechanical oil pump 3 is disposed near a rear end of the strainer 8 in the front-rear direction of the vehicle, and the electric oil pump 4 is disposed near a front end of the strainer 8. The mechanical oil pump 3 and the electric oil pump 4 are respectively provided along line segments X1 and X2 parallel to each other, but since the mechanical oil pump 3 and the electric oil pump 4 are disposed at the upper portion of the strainer 8 disposed in an inclined manner, a straight line La orthogonal to the line segments X1 and X2 is inclined at a predetermined angle $\theta$ with respect to a horizontal line HL.

Due to this inclination, a lower portion of the mechanical oil pump 3 disposed near the rear end of the upper portion of the strainer 8 is positioned in the oil reservoir PL, and a lower portion of the electric oil pump 4 is positioned in air above a liquid surface of the oil reservoir PL.

As shown in FIG. 1, the mechanical oil pump 3 and the electric oil pump 4 are provided with the suction ports 31 and 41 for the oil OL, respectively, and the strainer 8 is provided with connection ports 82 and 83. The suction ports 31 and 41 and the connection ports 82 and 83 are connected to each other via the oil passages 21 and 22, respectively.

As shown in FIG. 2, due to the inclination of the strainer 8, the suction port 31 provided in the lower portion of the mechanical oil pump 3 is positioned in the oil reservoir PL, and the suction port 41 provided in the lower portion of the electric oil pump 4 is positioned in the air. Since FIG. 1 is a schematic diagram, the suction port 31 of the mechanical oil pump 3 is also shown above the oil reservoir PL for convenience.

As shown in FIG. 1, the oil passage 22 connecting the suction port 41 of the electric oil pump 4 and the connection port 83 of the strainer 8 is provided with a check valve 91 as a valve device that prevents backflow of the oil OL in the oil passage 22 when the electric oil pump 4 is stopped.

The oil OL suctioned by the mechanical oil pump 3 and the oil OL suctioned by the electric oil pump 4 are supplied from discharge ports 32 and 42 to the pressure regulating circuit 70 via oil passages 23 and 24, respectively.

The oil passages 23 and 24 are provided with check valves 92 and 93, respectively. The check valve 92 is a valve device that prevents backflow of the oil OL in the oil passage 23 when the mechanical oil pump 3 is stopped. The check valve 93 is a valve device that prevents backflow of the oil OL in the oil passage 24 when the electric oil pump 4 is stopped.

The detailed configuration and operation of the check valves 91, 92, and 93 will be described later.

The pressure regulating circuit 70 includes solenoids those are formed inside the control valve body 7 (see FIG. 2) and those are driven by commands (energization) of the control device (not shown), and pressure regulating valves those operate based on signal pressures generated by the solenoids.

A first pressure regulating valve 71 regulates a line pressure based on the oil pressure generated by the electric oil pump 4 by regulating a drain amount of the oil OL from the first pressure regulating valve 71. The first pressure regulating valve 71 also supplies a part of the oil OL into the transmission case 5 (see FIG. 2) as a lubricating oil that lubricates components of the belt continuously variable transmission 1.

The line pressure regulated by the first pressure regulating valve 71 is supplied to a second pressure regulating valve 72, a primary pressure regulating valve 73, and a secondary pressure regulating valve 74.

The second pressure regulating valve 72 regulates a pilot pressure based on the line pressure.

The pilot pressure regulated by the second pressure regulating valve 72 is supplied to a solenoid 75 on a primary pulley P1 side and a solenoid 76 on a secondary pulley P2 side.

The solenoids 75 and 76 are connected to the primary pressure regulating valve 73 and the secondary pressure regulating valve 74, respectively. The solenoids 75 and 76 are controlled by the control device (not shown), regulate the supplied pilot pressures to desired signal pressures, and supply the signal pressures to the primary pressure regulating valve 73 and the secondary pressure regulating valve 74.

The primary pressure regulating valve 73 and the secondary pressure regulating valve 74 regulate, according to the signal pressures, the line pressure supplied from the first pressure regulating valve 71 to operating pressures, and supply the operating pressures to the oil chambers R1 and R2.

Figure 3:
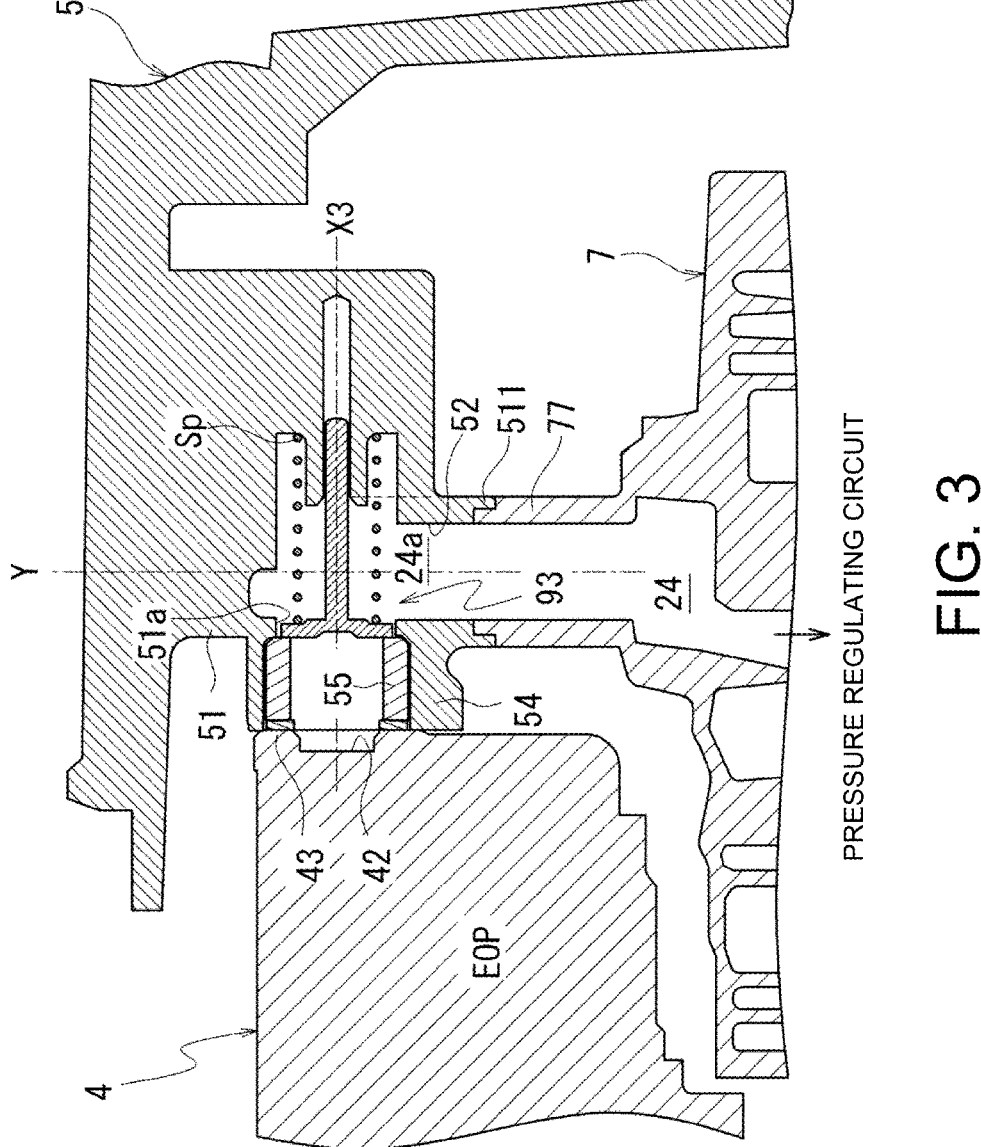
FIG. 3 is a diagram showing a specific configuration of a check valve provided in an oil passage.

FIG. 3 is a diagram showing a specific configuration of the check valve 93 provided in the oil passage 24.

Figure 4:
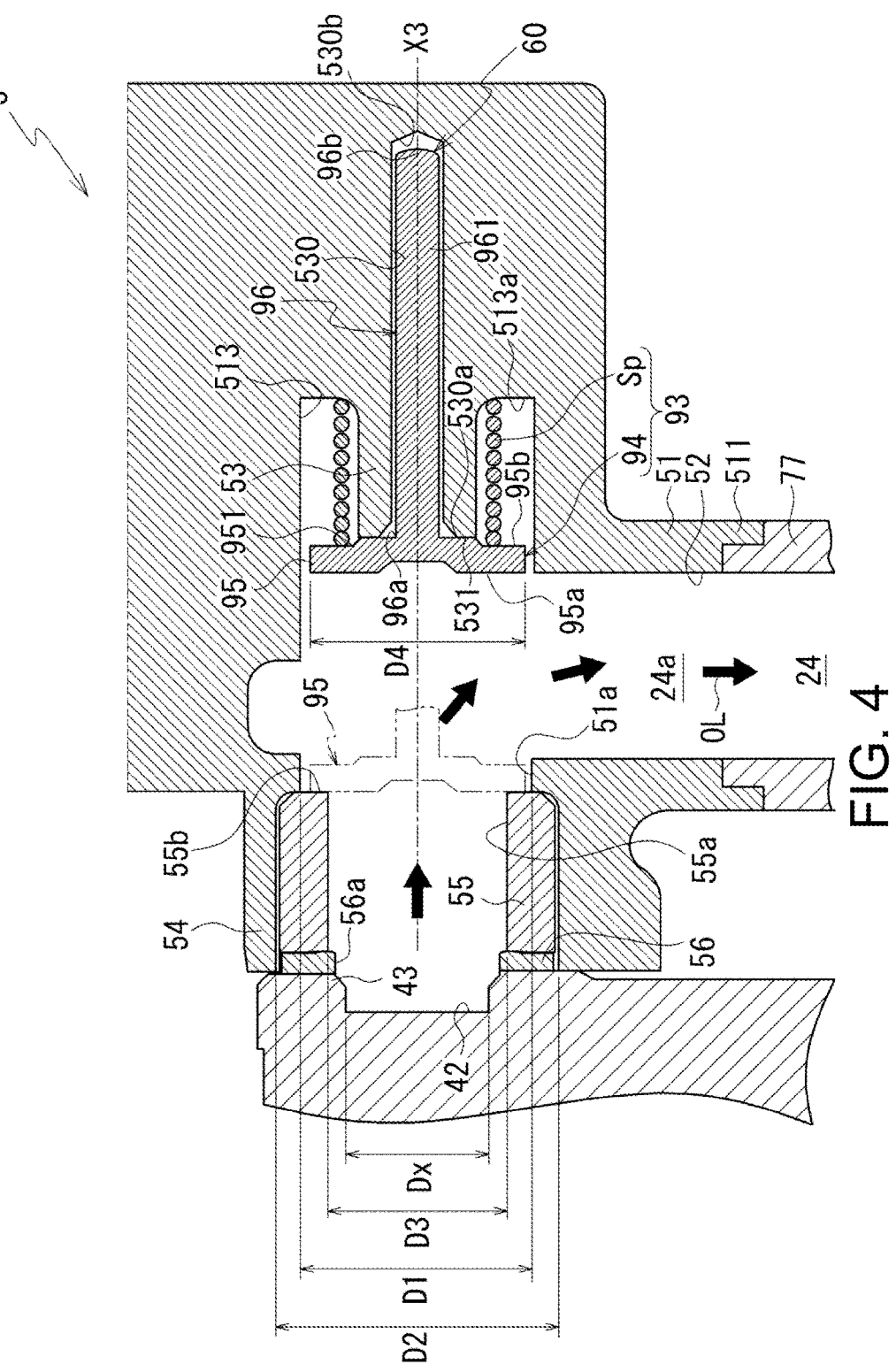
FIG. 4 is an enlarged view around the check valve in FIG. 3.

FIG. 4 is an enlarged view around the check valve 93 in FIG. 3.

In the following description, a direction in which the oil OL is fed from the oil reservoir PL to the pressure regulating circuit 70 by the suction of the electric oil pump 4 is referred to as an oil feeding direction. FIG. 3 shows an upstream side end portion 24a of the oil passage 24 in the oil feeding direction (hereinafter, simply referred to as an "upstream side end portion 24a"), which is connected to the discharge port 42 of the electric oil pump 4.

As shown in FIG. 3, the oil passage 24 is mainly formed inside the control valve body 7. The upstream side end portion 24a extends from the transmission case 5 to a control valve body 7 side and is formed inside a wall portion 51 connected to the control valve body 7.

The control valve body 7 is provided with a cylindrical wall portion 77 surrounding an outer periphery of the oil passage 24, and a distal end portion 511 of the wall portion 51 is fitted to an outer periphery of a distal end of the cylindrical wall portion 77. Thus, the inner peripheral side of the cylindrical wall portion 77 communicates with the inside of the wall portion 51. The oil passage 24 is connected to the inside of the control valve body 7 from the upstream side end portion 24a formed inside the wall portion 51.

In the wall portion 51, a circular opening portion 51a that communicates the discharge port 42 of the electric oil pump 4 with the upstream side end portion 24a of the oil passage 24 is formed so as to penetrate the wall portion 51 in a thickness direction. The opening portion 51a is provided such that an opening direction (a direction of an axis X3 that passes through a center of the opening 51a and that is orthogonal to an opening surface of the opening portion 51a in FIG. 3) is orthogonal to an axis Y direction along a direction in which the oil passage 24 extends in the control valve body 7.

As shown in FIG. 4, on an outer periphery of the opening portion 51a, a cylindrical peripheral wall portion 54 surrounding the opening portion 51a at a predetermined interval is provided with an inner diameter D2 larger than an opening diameter D1 of the opening portion 51a. Inside the peripheral wall portion 54, a cylindrical spacer 55 and a seal ring 56 are provided such that an opening 55a of the spacer 55 and an opening 56a of the seal ring 56 are oriented along the opening direction of the opening portion 51a.

The seal ring 56 is positioned on the electric oil pump 4 side of the spacer 55, and is sandwiched between the spacer 55 and a wall portion 43 surrounding the discharge port 42 of the electric oil pump 4.

An opening diameter D3 of the opening 55a of the spacer 55 is smaller than the opening diameter D1 of the opening portion 51a and larger than an opening diameter Dx of the discharge port 42 of the electric oil pump 4, and an opening diameter of the opening 56a of the seal ring 56 is larger than the opening diameter Dx of the discharge port 42.

The discharge port 42 of the electric oil pump 4, the opening 56a of the seal ring 56, and the opening 55a of the spacer 55 are concentrically disposed on an extension of the opening portion 51a (on the axis X3), and the movement of the oil OL discharged from the electric oil pump 4 into the oil passage 24 is not blocked by the spacer 55 or the seal ring 56.

The check valve 93 is installed in the oil passage 24 on the opposite side of the spacer 55 with the opening portion 51a interposed between the spacer 55 and the oil passage 24.

The check valve 93 is a so-called flapper valve, and includes a valve body 94 that is movable forward and backward in the direction of the axis X3, and a spring Sp that biases the valve body 94 toward the opening portion 51a side in the direction of the axis X3.

The valve body 94 is made of, for example, an aluminum alloy, and includes a disk-shaped valve portion 95 and a columnar shaft portion 96, which are integrally formed. The valve portion 95 is disposed such that one end surface 95a side faces the opening portion 51a side. The shaft portion 96 is provided on the other end surface 95b side of the valve portion 95, and extends in the direction of the axis X3.

The wall portion 51 is provided with a housing portion 513 for the check valve 93 at a position facing the opening portion 51a. The housing portion 513 is open to the inside of a connection portion of the oil passage 24 on the extension of the opening portion 51a (on the axis X3), and houses the check valve 93 moved in a direction away from the opening portion 51a.

The housing portion 513 is a space having an inner diameter slightly larger than an outer diameter D4 of the valve portion 95 of the valve body 94, and a support portion 53 for the valve body 94 is formed at a center of a bottom portion 513a of the housing portion 513 so as to protrude toward the oil passage 24 (the electric oil pump 4).

In the support portion 53, a hole portion 530 into which the shaft portion 96 of the check valve 93 is inserted is provided so as to be open on the oil passage 24 side, and the hole portion 530 extends linearly along the axis X3 in the support portion 53 in a direction away from the oil passage 24.

One end of the hole portion 530 on the opening portion 51a side in the direction of the axis X3 is an opening end 530a. A bottom portion 530b is formed at the other end of the hole portion 530, and the hole portion 530 is closed.

The hole portion 530 extends to the inside of the wall portion 51 beyond the inner diameter side of the support portion 53. The shaft portion 96 of the check valve 93 is inserted into the hole portion 530 from the opening end 530a.

As shown in FIG. 4, a portion of the support portion 53 surrounding the opening end 530a of the hole portion 530 is a valve seat portion 531. When a distal end 96b of the shaft portion 96 moves to the bottom portion 530b and the entire length of the shaft portion 96 is housed in the hole portion 530, a step portion 951 formed at a center of the valve portion 95 abuts against the valve seat portion 531 surrounding the opening end 530a of the hole portion 530.

The spring Sp is externally inserted and attached to an outer periphery of the support portion 53. One end of the spring Sp is positioned in the direction of the axis X3 on an inner peripheral surface of the oil passage 24, and the other end of the spring Sp abuts against the other end surface 95b of the valve portion 95.

In the present embodiment, the spring Sp is compressed in the direction of the axis X3 in a state in which the valve portion 95 of the check valve 93 abuts against the end surface 55b of the spacer 55.

Therefore, when the electric oil pump 4 is stopped, the valve portion 95 is pressed against the end surface 55b of the spacer 55 by a biasing force of the spring Sp, and is held at a position where the opening portion 51a is closed.

When the electric oil pump 4 is operated in this state, a pressing force of the oil OL discharged from the electric oil pump 4 acts on the valve portion 95. Therefore, when the pressing force becomes larger than the biasing force of the spring Sp, the valve portion 95 is pushed back in a direction away from the spacer 55 while compressing the spring Sp in the direction of the axis X3 (see FIG. 4).

Thus, the valve portion 95 is pushed into the oil passage 24 to a position where the step portion 951 on the other end surface 95b side abuts against the valve seat portion 531, and the opening portion 51a closed by the valve portion 95 is open.

Thus, the discharge port 42 of the electric oil pump 4 communicates with the oil passage 24 in the wall portion 51, and thus the oil OL discharged from the electric oil pump 4 is supplied into the oil passage 24 of the control valve body 7 through the upstream side end portion 24a.

In this way, the check valve 93 provided in the oil passage 24 switches between communication and block between the oil passage 24 and the discharge port 42 of the electric oil pump 4 in accordance with the operation and the stop of the electric oil pump 4.

The check valve 92 shown in FIG. 1, which is provided in the oil passage 23 connecting the mechanical oil pump 3 and the pressure regulating circuit 70, may also be a flapper valve having the same configuration as the check valve 93. Although detailed description is omitted, the check valve 92 switches between communication and block between the oil passage 23 and the discharge port 32 of the mechanical oil pump 3 in accordance with the operation and the stop of the mechanical oil pump 3.

Figure 5:
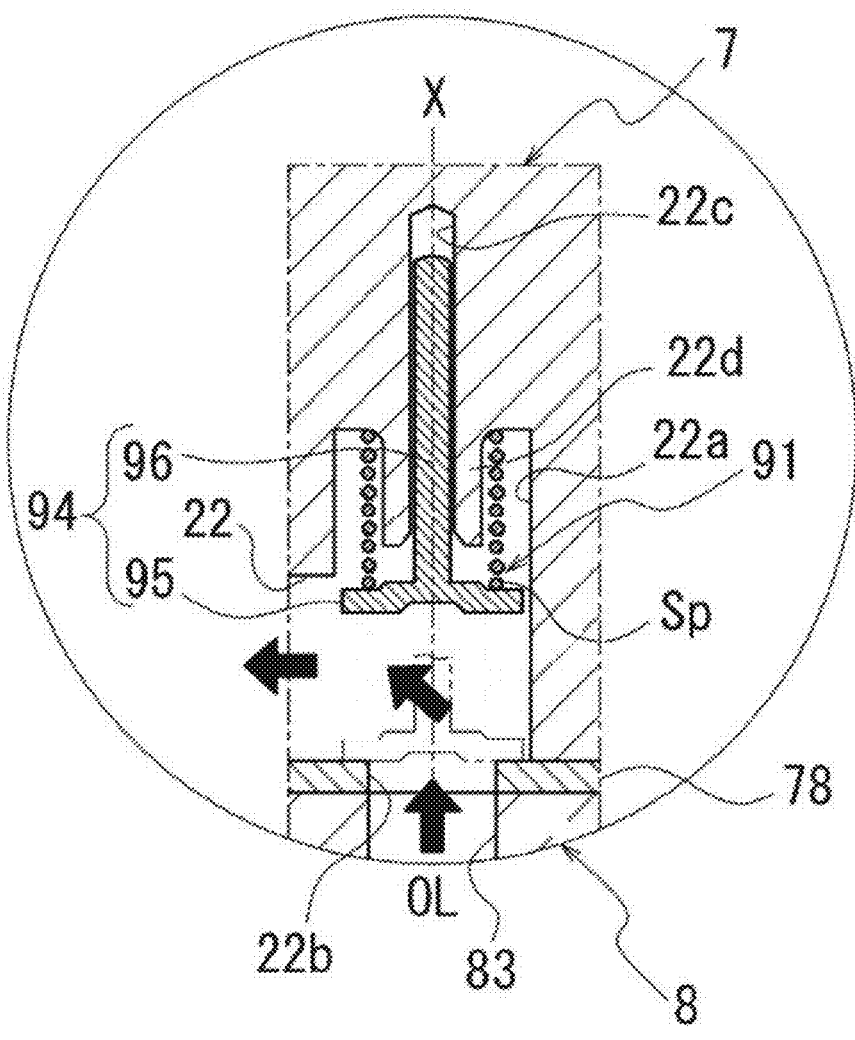
FIG. 5 is a diagram showing a specific configuration of a check valve provided in an oil passage.

FIG. 5 is a diagram showing a specific configuration of the check valve 91 provided in the oil passage 22.

As shown in FIG. 5, the check valve 91 is provided at an upstream side end portion 22a of the oil passage 22 in the oil feeding direction (hereinafter, simply referred to as an "upstream side end portion 22a"), which is connected to the connection port 83 of the strainer 8.

The upstream side end portion 22a is provided with an opening portion 22b communicating with the connection port 83. The opening portion 22b is formed in a separate plate 78 disposed inside the control valve body 7. The connection port 83 protruding upward from the strainer 8 is fitted into the control valve body 7 and faces the opening portion 22b provided inside the control valve body 7.

An opening direction of the opening portion 22b is disposed along an axis X direction which is an opening direction of the connection port 83, and the opening portion 22b is positioned above the connection port 83 in the vertical line VL direction (see FIG. 2). By the suction of the electric oil pump 4, the oil OL flows from below upwards in the gravity direction and flows through the connection port 83 and the opening portion 22b, and is introduced into the oil passage 22.

The check valve 91 is a flapper valve having the same configuration as the check valve 93, and includes a valve body 94 including the valve portion 95 and the shaft portion 96. The shaft portion 96 is slidably supported in a hole portion 22c formed inside the control valve body 7 in which the oil passage 22 is formed. The hole portion 22c is provided along the axis X direction which is the opening direction of the opening portion 22b, and a support portion 22d is formed on an outer periphery of the hole portion 22c. The spring Sp for biasing the valve portion 95 is externally inserted into the support portion 22d.

While the electric oil pump 4 is stopped, the valve portion 95 is pressed against the opening portion 22b by the biasing force of the spring Sp to close the opening portion 22b. When the electric oil pump 4 is operated, a negative pressure generated by the electric oil pump 4 suctioning the oil OL is applied. When the negative pressure becomes larger than the biasing force of the spring Sp, the valve portion 95 of the check valve 91 is displaced in a direction away from the opening portion 22b, and the opening portion 22b is open.

In this way, the check valve 91 opens and closes the opening portion 22b in accordance with the operation and the stop of the electric oil pump 4, thereby switching between communication and block between the oil passage 22 and the connection port 83 of the strainer 8.

Here, as shown in FIG. 1, the check valve 92 provided on the discharge port 32 side of the mechanical oil pump 3 and the check valve 93 provided on the discharge port 42 side of the electric oil pump 4 are required to have pressure resistance because a high oil pressure, which is an original pressure of the line pressure, is applied to the check valves 92 and 93. As described above, the check valves 92 and 93 may be valve bodies 94 made of, for example, an aluminum alloy in order to improve the pressure resistance.

On the other hand, the pressure applied to the check valve 91 provided on the suction port 41 side of the electric oil pump 4 during the operation of the electric oil pump 4 is a negative pressure lower than the original pressure. Therefore, since the required pressure resistance is lower than that of the check valves 92 and 93, for example, the valve body 94 of the check valve 91 may be made of a resin.

Hereinafter, the operation of the check valves 91 and 93 during the operation and the stop of the electric oil pump 4 in the oil pressure supply device 2 according to the present embodiment will be described.

Figure 6:
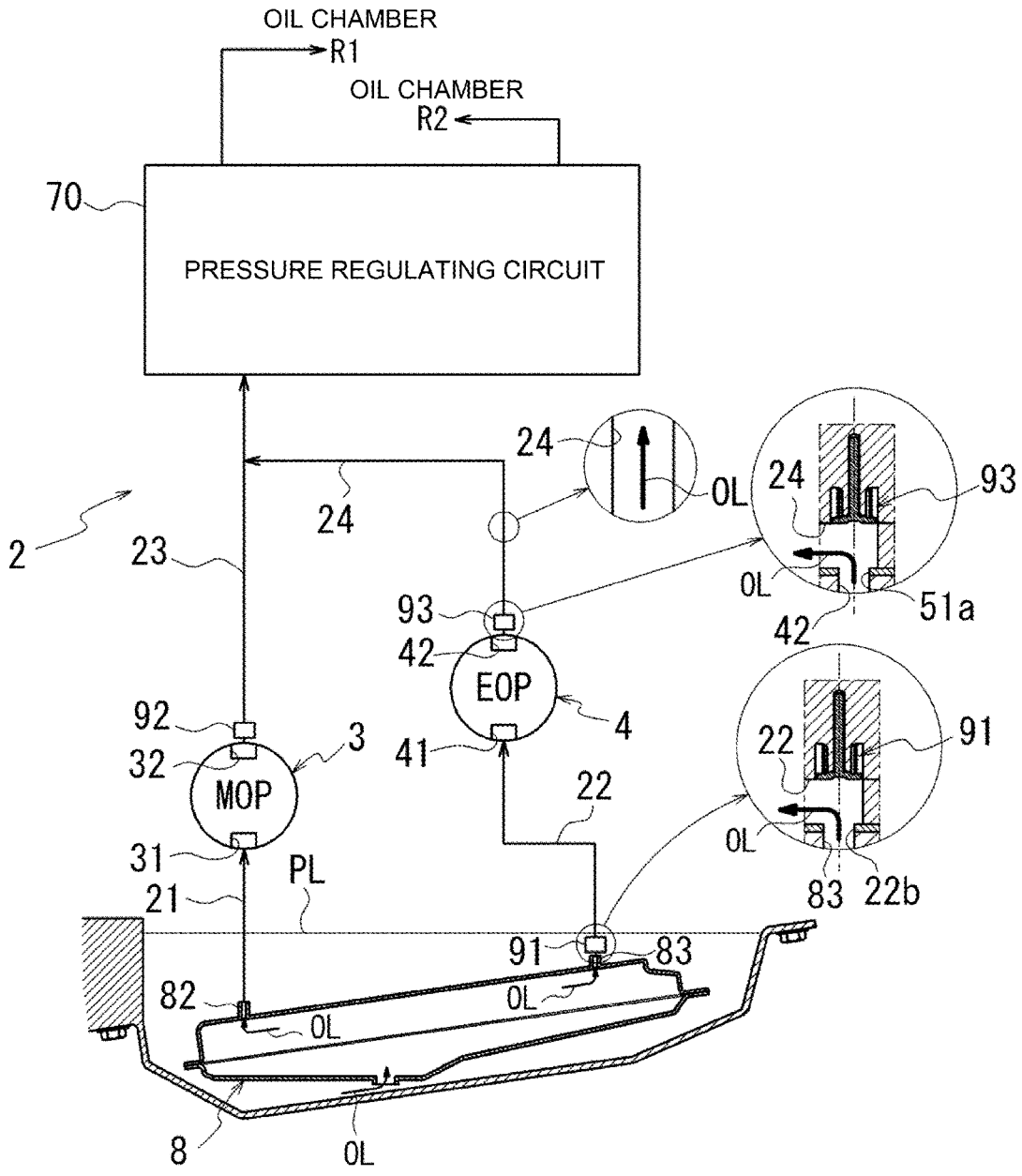
FIG. 6 is a diagram showing an operation of the check valve during an operation of an electric oil pump.

FIG. 6 is a diagram showing the operation of the check valves 91 and 93 during the operation of the electric oil pump 4.

Figure 7:
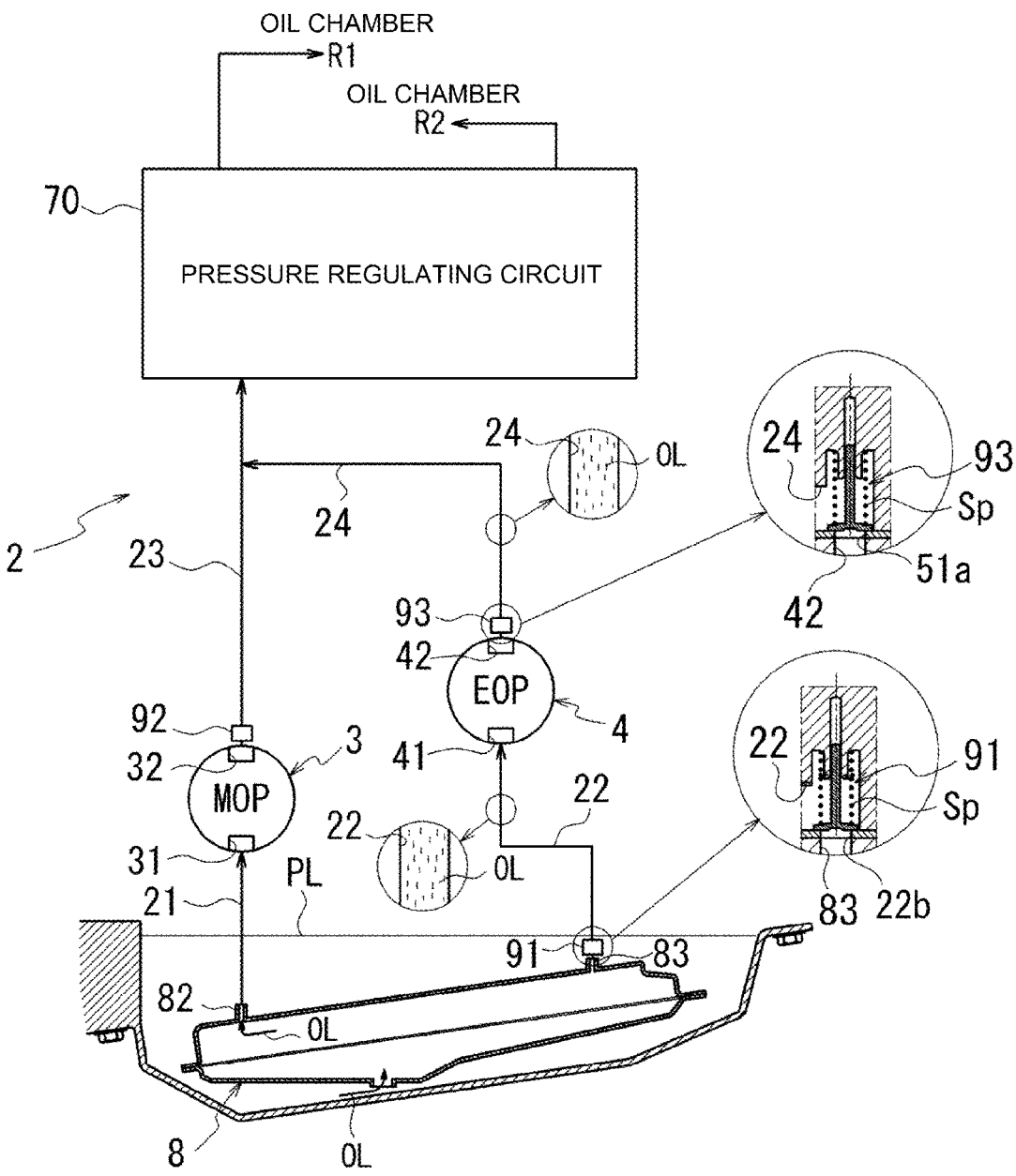
FIG. 7 is a diagram showing an operation of the check valve when the electric oil pump is stopped.
Figure 8:
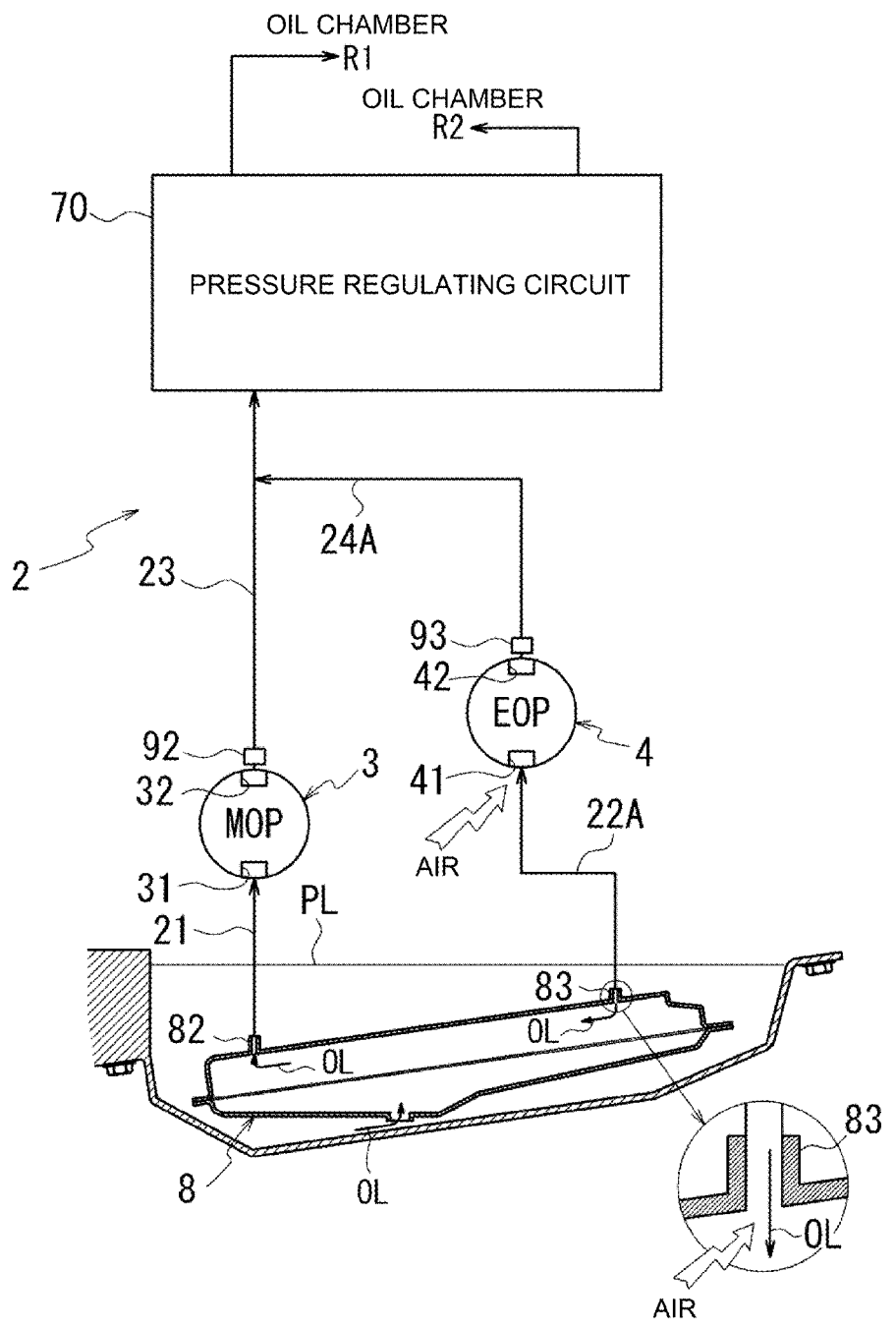
FIG. 8 is a diagram showing a case where a check valve is not provided in an oil passage as a comparative example.

Here, a case where the electric oil pump 4 is operated in combination with the mechanical oil pump 3 will be described. In FIGS. 6 to 8, the configuration around the check valve 93 is shown in a simplified manner.

For example, when a high oil pressure is required due to the downshift or the like of the belt continuously variable transmission 1, the electric oil pump 4 is operated to increase the oil pressure supplied by the mechanical oil pump 3.

When the electric oil pump 4 is operated by the control device (not shown) and suction of the oil OL is started, as shown in FIG. 6, the check valve 91 of the oil passage 22 receives a negative pressure and is displaced in a direction in which the opening portion 22b is open, whereby the oil passage 22 communicates with the connection port 83 of the strainer 8. Thus, the oil OL in the oil reservoir PL filtered by the strainer 8 flows through the oil passage 22 and is suctioned into the electric oil pump 4.

When the electric oil pump 4 discharges the suctioned oil OL from the discharge port 42, the check valve 93 of the oil passage 24 receives the oil pressure which is the original pressure of the line pressure, and is displaced in a direction in which the opening portion 51a is open. Thus, the oil passage 24 communicates with the discharge port 42 of the electric oil pump 4. The oil OL suctioned into the electric oil pump 4 from the strainer 8 flows through the oil passage 24. The original pressure of the line pressure generated by the suction of the electric oil pump 4 is supplied to the pressure regulating circuit 70 via the oil passage 24.

The original pressure supplied by the electric oil pump 4 is regulated together with an original pressure supplied by the mechanical oil pump 3 in the pressure regulating circuit 70, and is supplied to the oil chambers R1 and R2.

FIG. 7 is a diagram showing the operation of the check valves 91 and 93 when the electric oil pump 4 is stopped.

When a required amount of oil pressure is supplied to the oil chambers R1 and R2, the control device (not shown) stops the electric oil pump 4.

When the electric oil pump 4 is stopped, as shown in FIG. 7, the oil pressure is not applied to the check valve 93 of the oil passage 24, so that the check valve 93 is displaced, by the biasing force of the spring Sp, in a direction in which the opening portion 51a is closed, and blocks the communication between the oil passage 24 and the discharge port 42 of the electric oil pump 4.

Similarly, since the negative pressure of the electric oil pump 4 is not applied to the check valve 91 of the oil passage 22, the check valve 91 is displaced, by the biasing force of the spring Sp, in a direction in which the opening portion 22b is closed, and blocks the communication between the oil passage 22 and the connection port 83 of the strainer 8.

In this way, in the present embodiment, when the electric oil pump 4 is stopped, an upstream side and a downstream side of the electric oil pump 4 are blocked by the check valves 91 and 93, respectively.

Hereinafter, the operation in the case where either or both of the check valves 91 and 93 are not provided will be described as comparative examples 1, 2, and 3. In order to distinguish from the present embodiment, in the comparative examples 1, 2, and 3, the oil passages 22 and 24 are replaced with oil passages 22A and 24A (see FIG. 8).

Comparative Example 1: Case where Both of Check Valves 91 and 93 are not Provided When the electric oil pump 4 is stopped, the oil OL flows back to the electric oil pump 4 side from the mechanical oil pump 3 or the pressure regulating circuit 70 via the oil passage 24A. This backflow reduces the amount of the oil OL supplied from the mechanical oil pump 3 to the pressure regulating circuit 70. Thus, it is necessary to increase a discharge amount of the mechanical oil pump 3, which affects fuel consumption in the vehicle.

Comparative Example 2: Case where Check Valve 91 is not Provided

FIG. 8 is a diagram showing the comparative example 2.

Unlike the comparative example 1, since the check valve 93 is provided in the oil passage 24A, it is possible to prevent the backflow from the mechanical oil pump 3 to the electric oil pump 4. On the other hand, when the suction of the oil OL by the electric oil pump 4 is stopped in the oil passage 22A, air enters the oil passage 22A from gaps between components such as the suction port 41 of the electric oil pump 4 positioned in the air. The air accumulated in the strainer 8 may enter the inside of the oil passage 22A.

In this way, when air enters the oil passage 22A in which the check valve 91 is not provided, the oil OL leaks from the oil passage 22A.

When the electric oil pump 4 is operated in a state in which the oil OL is leaked from the oil passage 22A, the electric oil pump 4 may suction the air that first enters the oil passage 22A and may idle, and the timing at which the discharge of the oil OL is started may be delayed.

Comparative Example 3: Case where Check Valve 93 is not Provided

By providing the check valve 91 in the oil passage 22A, it is possible to prevent the oil from leaking from the oil passage 22A. However, as described above, the oil OL flows back from the mechanical oil pump 3 or the pressure regulating circuit 70 to the electric oil pump 4 side via the oil passage 24A in which the check valve 93 is not provided. The check valve 91 is normally operated by the negative pressure generated by the suction of the electric oil pump 4, and is not required to have pressure resistance. However, when a high pressure is applied to the valve body 94 due to the backflow of the oil OL, the product life of the check valve 91 may be shortened.

As described above, in the case where the electric oil pump 4 is used in combination with the mechanical oil pump 3 at the time of a downshift or the like in which a high oil pressure is required, it is required to quickly supply the oil pressure to the oil chambers R1 and R2.

Therefore, as shown in FIG. 7, in the present embodiment, by providing the check valve 91 in the oil passage 22, the oil OL is prevented from leaking from the oil passages 22 and 24 when the electric oil pump 4 is stopped. Since the oil OL is held in the oil passages 22 and 24, the amount of air entering the oil passages 22 and 24 through the suction port 41 and the discharge port 42 of the electric oil pump 4 is reduced.

As shown in FIG. 6, when the electric oil pump 4 is operated in a state in which the oil OL is present in the oil passage 22, the idling due to the suction of air is reduced. Further, since the electric oil pump 4 suctions the oil OL in the oil passage 22 and starts to discharge the oil OL before the check valve 91 of the oil passage 22 is open, the electric oil pump 4 promptly supplies the oil pressure to the oil chambers R1 and R2.

Further, as shown in FIG. 2, the electric oil pump 4 suctions the oil OL stored in the oil reservoir PL. The oil OL is oil which is stirred in the oil reservoir PL by the rotation of the components of the belt continuously variable transmission 1 and then falls into the oil pan 6 along a wall surface of the transmission case 5 or the like. Therefore, the oil OL in the oil reservoir PL contains a large amount of air particles K. The oil OL containing the air particles K is suctioned into the strainer 8. The air particles K move upward in the vertical line VL direction inside the strainer 8 due to buoyancy, and form an air reservoir Air.

As described above, in the strainer 8, the front end side where the electric oil pump 4 is disposed is positioned above the rear end side where the mechanical oil pump 3 is disposed in the vertical line VL direction. Therefore, the air reservoir Air is easily formed on the front end side of the strainer 8 where the electric oil pump 4 is disposed.

In the case where the check valve 91 is not provided in the oil passage 22, when the electric oil pump 4 is stopped, the air in the air reservoir Air formed on the front end side of the strainer 8 may enter the oil passage 22 through the connection port 83 (see FIG. 1) due to the suction of the oil OL by the mechanical oil pump 3. Accordingly, a large amount of air may be suctioned when the electric oil pump 4 is operated, and the discharge timing may be delayed.

In the present embodiment, when the electric oil pump 4 is stopped, the check valve 91 blocks the communication between the oil passage 22 and the connection port 83 of the strainer 8, whereby when the electric oil pump 4 is stopped, the air accumulated on the front end side of the strainer 8 can be prevented from entering the oil passage 22 through the connection port 83 and the oil OL can be prevented from leaking from the oil passage 22.

When the electric oil pump 4 is operated, since the electric oil pump 4 suctions the oil OL inside the oil passage 22 and starts to discharge the oil OL, it is unlikely to lead to a discharge delay of the electric oil pump 4 even when the air in the air reservoir Air is suctioned after the check valve 91 is retracted to cause the oil passage 22 and the connection port 83 to communicate with each other.

Further, in the present embodiment, by providing the check valve 93 in the oil passage 24 as well, when the electric oil pump 4 is stopped, it is possible to prevent the oil OL from flowing back to the electric oil pump 4 side from the mechanical oil pump 3 or the pressure regulating circuit 70. This prevents a reduction in the amount of the oil OL supplied from the mechanical oil pump 3 to the pressure regulating circuit 70, and further prevents a high pressure from being applied to the check valve 91 of the oil passage 22 by the backflow of the oil OL.

In the present embodiment, a high pressure is also prevented from being applied to the check valve 91 by controlling the timing of the operation of the check valves 91 and 93.

Figure 9:
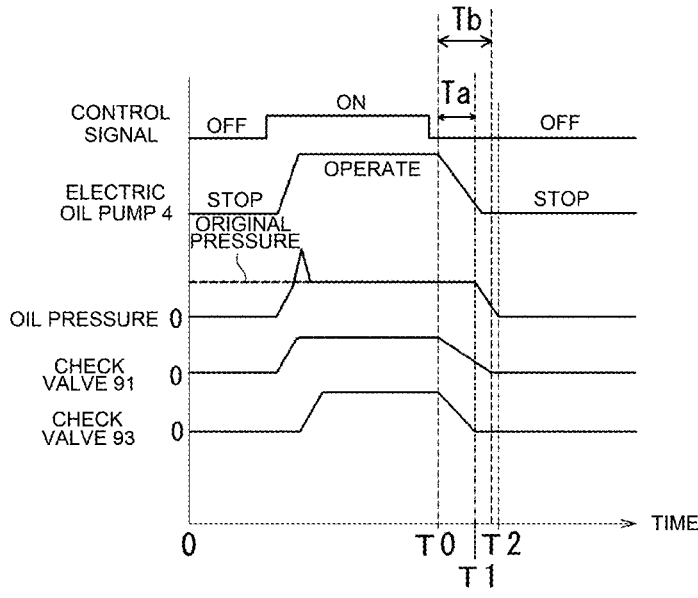
FIG. 9 is a timing chart relating to the operation of the check valve according to the embodiment.

FIG. 9 is a timing chart relating to the operation of the check valves 91 and 93 according to the present embodiment.

FIG. 9 shows displacements of the check valve 91 and the check valve 93 in accordance with the operation and the stop of the electric oil pump 4. The graphs for the check valve 91 and the check valve 93 show displacement amounts thereof in the opening direction of the oil passages 22 and 24, respectively, and when the displacement amounts are zero, the check valve 91 and the check valve 93 close the oil passage 22 and the oil passage 24, respectively.

As shown in FIG. 9, when the control device (not shown) outputs an ON signal, the electric oil pump 4 is operated.

When the electric oil pump 4 starts to suction the oil OL in the oil passage 22, a negative pressure is applied to the check valve 91, and the check valve 91 starts to be displaced in a direction in which the oil passage 22 is open.

When the electric oil pump 4 starts to discharge the oil OL, an oil pressure is applied to the check valve 93, and the check valve 93 starts to be displaced in a direction in which the oil passage 24 is open.

The oil pressure of the electric oil pump 4 rapidly increases after the operation is started, but after the oil passages 22 and 24 are open, the discharge at an original pressure necessary for regulating the line pressure is maintained.

When the control device (not shown) outputs an OFF signal, the electric oil pump 4 stops the suction of the oil OL (timing T0). The oil pressure of the electric oil pump 4 starts to gradually decrease at a timing T1 after the electric oil pump 4 is stopped, and becomes zero at a timing T2.

Since a flow rate of the oil OL in the oil passage 24 and the oil passage 22 is reduced by stopping the suction and the discharge of the electric oil pump 4, the oil pressure applied to the check valve 93 and the negative pressure applied to the check valve 91 are gradually reduced. Thus, at the timing T0 the check valve 93 and the check valve 91 start to be displaced in directions in which the oil passages 22 and 24 are closed, respectively.

The check valve 93 completes the closing of the oil passage 24 after the elapse of a time Ta from the timing T0, and the check valve 91 completes the closing of the oil passage 22 after the elapse of a time Tb from the timing T0. In the present embodiment, the time Ta is shorter than the time Tb. That is, although the check valve 93 and the check valve 91 start to be displaced at the same timing T0, the check valve 93 closes the oil passage 24 earlier than the check valve 91 closes the oil passage 22.

For example, a stroke speed of the check valve 93 is set to be faster than a stroke speed of the check valve 91 such that the check valve 93 completes closing earlier than the check valve 91. The stroke speed may be set by, for example, performing a test or simulation in advance and adjusting a load of the spring Sp constituting each of the check valves 93 and 91.

The timing chart in FIG. 9 is merely an example. The check valve 93 completes closing at least before the check valve 91, and the check valve 91 and the check valve 93 may not necessarily start to be displaced at the same timing.

Figure 10:
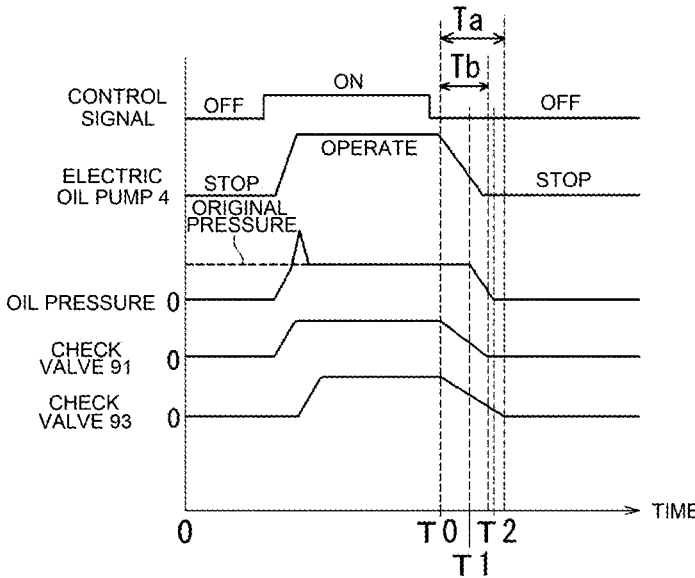
FIG. 10 is a timing chart relating to the operation of the check valve according to a comparative example.

FIG. 10 is a timing chart relating to the operation of the check valves 91 and 93 according to a comparative example.

As shown in FIG. 10, in the comparative example, the time Ta for the check valve 93 to close the oil passage 24 is longer than the time Tb for the check valve 91 to close the oil passage 22. That is, before the check valve 93 completes the closing of the oil passage 24, the check valve 91 completes the closing of the oil passage 22.

The timing at which the check valve 91 completes the closing of the oil passage 22 is before the timing T2 at which the oil pressure of the electric oil pump 4 becomes zero, that is, a state in which the oil pressure of the electric oil pump 4 is still generated.

In this state, when the check valve 91 is closed before the check valve 93, a part of the oil OL in the oil passage 24 may flow back to the oil passage 22 on the upstream side in the oil feeding direction, and the oil pressure of the oil OL may be applied to the check valve 91 that is closing the oil passage 22. The oil pressure of the backflow oil OL is increased to the original pressure necessary for regulating the line pressure by the suction of the electric oil pump 4.

Meanwhile, as described above, since the check valve 91 of the oil passage 22 is normally operated by a negative pressure generated by the suction of the electric oil pump 4 and is not required to have pressure resistance as compared with the check valve 93, for example, a valve body 94 made of a resin may be used.

However, when a high pressure is applied to the valve body 94 made of a resin due to the backflow of the oil OL, the product life of the check valve 91 may be shortened. In order to improve the pressure resistance of the check valve 91, for example, a valve body 94 made of an aluminum alloy may be used, but a production cost of the check valve 91 may increase.

Further, the check valve 91 is pressed against the opening portion 22*b* (see FIG. 5) of the oil passage 22 communicating with the connection port 83 of the strainer 8. Therefore, the oil pressure applied to the valve body 94 is also transmitted to the connection port 83, which may lead to a decrease in the product life of the strainer 8.

Therefore, in the present embodiment, as shown in FIG. 9, by adjusting the load of the spring Sp constituting each of the check valves 91 and 93, the check valve 93 is set to complete the closing of the oil passage 24 earlier than the check valve 91 completes the closing of the oil passage 22.

Thus, since it is possible to prevent a part of the oil OL in the oil passage 24 from flowing back to the oil passage 22 and a high pressure from being applied to the check valve 91, the possibility of a decrease in the product life can be lowered when the valve body 94 made of a resin, for example, is used as the check valve 91.

As described above, (1) The oil pressure supply device 2 according to the present embodiment supplies an oil pressure generated by suctioning the oil OL from the oil reservoir PL (oil source) by the electric oil pump 4 (oil pump) to the oil chambers R1 and R2.

The oil pressure supply device 2 includes: the oil passage 22 (first oil passage) connected to the suction side of the electric oil pump 4;

the check valve 91 (first check valve) provided in the oil passage 22 and configured to close the oil passage 22 and prevent the oil OL from moving to the oil reservoir PL side when the electric oil pump 4 is stopped;

the oil passage 24 (second oil passage) connected to a discharge side of the electric oil pump 4; and the check valve 93 (second check valve) provided in the oil passage 24 and configured to close the oil passage 24 and prevent the oil OL from moving to the electric oil pump 4 side when the electric oil pump 4 is stopped, in which 13 14 when the electric oil pump 4 is stopped, the check valve 93 closes the oil passage 24 earlier than the check valve 91 closes the oil passage 22.

When the electric oil pump 4 is stopped, air may enter the oil passage 22 through gaps or the like between components, and the air may cause the oil OL to leak from the oil passage 22 connecting the oil reservoir PL and the electric oil pump 4. When the oil OL leaks from the oil passage 22, if the electric oil pump 4 is operated again, the electric oil pump 4 idles until the air is discharged, and the discharge of the oil OL may be delayed.

When the electric oil pump 4 is used during the stop of the mechanical oil pump 3, such as idling stop, a slight operation delay does not cause a problem. On the other hand, in the case where the electric oil pump 4 is used as an auxiliary for the mechanical oil pump 3 when a high oil pressure is required, for example, when a continuously variable transmission is downshifted, the electric oil pump 4 is required to operate promptly.

Therefore, the check valve 91 that closes the oil passage 22 and the check valve 93 that closes the oil passage 24 when the electric oil pump 4 is stopped are provided in the oil passages 22 and 24 respectively connected to the suction side and the discharge side of the electric oil pump 4. Thus, it is possible to prevent the oil OL from leaking from the oil passage 22 when the electric oil pump 4 is stopped, and it is possible to improve the responsiveness of the electric oil pump 4.

Here, when the check valve 91 on the suction side of the electric oil pump 4 is closed earlier than the check valve 93 on the discharge side, the oil OL in the oil passage 24 may flow back to the check valve 91, and a high pressure on the discharge side of the electric oil pump 4 may be applied to the check valve 91, which may lead to a decrease in the product life. The valve body 94 of the check valve 91 may be made of an aluminum alloy to improve the pressure resistance, but the production cost increases.

In the present embodiment, when the electric oil pump 4 is stopped, by closing the check valve 93 earlier than the check valve 91, it is possible to prevent the oil OL in the oil passage 24 from flowing back to the oil passage 22 and a high pressure from being applied to the check valve 91, and it is possible to improve the responsiveness of the electric oil pump 4 while preventing an increase in the production cost.

(2) The check valve 91 is a flapper valve that includes the valve body 94 (first valve body) and the spring Sp (first spring member). The valve body 94 is movable forward and backward in the opening direction (axis X direction) of the opening portion 22b of the oil passage 22 and opens and closes the opening portion 22b, and the spring Sp biases the valve body 94 in a direction in which the opening portion 22b is closed.

When the electric oil pump 4 is stopped, the valve body 94 is held, by a biasing force of the spring Sp, at a position at which the opening portion 22b is closed, and when a negative pressure is supplied by the operation of the electric oil pump 4, the valve body 94 is displaced in a direction in which the opening portion 22b is open.

By using a flapper valve as the check valve 91, it is possible to increase a flow rate of the oil OL when the oil passage 22 is open as compared with, for example, a ball valve.

(3) The check valve 93 is a flapper valve that includes the valve body 94 (second valve body) and the spring Sp (second spring member). The valve body 94 is movable forward and backward in the opening direction (axis X3 direction) of the opening portion 51a of the oil passage 24 and opens and closes the opening portion 51a, and the spring Sp biases the valve body 94 in a direction in which the opening portion 51a is closed.

When the electric oil pump 4 is stopped, the valve body 94 is held, by a biasing force of the spring Sp, at a position at which the opening portion 51a is closed by the valve body 94, and when an oil pressure is supplied by the operation of the electric oil pump 4, the valve body 94 is displaced in a direction in which the opening portion 51a is open.

By using a flapper valve as the check valve 93, it is possible to increase the flow rate of the oil OL when the oil passage 24 is open as compared with, for example, a ball valve.

(4) When the electric oil pump 4 is stopped, the loads of the springs Sp of the check valve 91 and the check valve 93 are set such that the valve body 94 of the check valve 93 closes the opening portion 51a of the oil passage 24 earlier than the valve body 94 of the check valve 91 closes the opening portion 22b of the oil passage 22.

Since the load of the spring Sp can be easily changed, an electronic circuit or the like is not required, and the check valve 93 can be easily controlled to be closed earlier than the check valve 91.

(5) The valve body 94 of the check valve 91 is made of a resin, and the valve body 94 of the check valve 93 is made of an aluminum alloy.

Since the pressure resistance of the check valve 91 made of a resin is lower than that of the check valve 93 made of an aluminum alloy, it is possible to prevent a high pressure from being applied to the check valve 91 by closing the check valve 93 earlier than the check valve 91.

(6) The electric oil pump 4 suctions the oil OL from the oil reservoir PL, which is an oil source, via the strainer 8 that filters the oil OL, the strainer 8 includes the connection port 83 with the oil passage 22, and the check valve 91 blocks the communication between the oil passage 22 and the connection port 83 when the electric oil pump 4 is stopped.

When a high pressure is applied to the check valve 91 that closes the opening portion 22b of the oil passage 22 communicating with the connection port 83 of the strainer 8, the pressure is also transmitted to the connection port 83, which may lead to a decrease in the product life of the strainer 8. In the present embodiment, when the electric oil pump 4 is stopped, the check valve 93 is closed earlier than the check valve 91, whereby the pressure can be prevented from being transmitted to the connection port 83.

While the embodiments of the present invention have been described above, the above description of the embodiments of the invention is merely one example of application of the invention, and is not intended to limit the technical scope of the invention to the specific configuration of the above embodiments.

In the present embodiment, as shown in FIG. 2, an example in which the transmission case 5 is disposed to be inclined due to layout restrictions or the like has been described, but the present invention is not limited thereto. For example, if the layout is relatively free, the transmission case 5, the oil pan 6, and the strainer 8 may be horizontally disposed without being inclined, and the suction port 41 of the electric oil pump 4 may be positioned in the oil in the oil reservoir PL.

The present application claims a priority of Japanese Patent Application No. 2019-238015 filed with the Japan Patent Office on Dec. 27, 2019, all the contents of which are hereby incorporated by reference.

The invention claimed is:

1. An oil pressure supply device for supplying, to an oil chamber, an oil pressure generated by suctioning oil from an oil source with an oil pump, the oil pressure supply device comprising:

a first oil passage connected to a suction side of the oil pump;

a first check valve provided in the first oil passage and configured to close the first oil passage and prevent oil from moving from the oil pump to the oil source when the oil pump is stopped;

a second oil passage connecting a discharge side of the oil pump and a pressure regulating circuit including a pressure regulating valve; and a second check valve provided in the second oil passage and configured to close the second oil passage and prevent oil from moving from the pressure regulating circuit to the oil pump when the oil pump is stopped, wherein when the oil pump is stopped, the second check valve closes the second oil passage earlier than the first check valve closes the first oil passage.

2. The oil pressure supply device according to claim 1, wherein the first check valve is a flapper valve that includes a first valve body and a first spring member, the first valve body being movable forward and backward in an opening direction of an opening portion of the first oil passage and being configured to open and close the opening portion of the first oil passage, and the first spring member being configured to bias the first valve body in a direction in which the opening portion of the first oil passage is closed, and the first valve body is held, by a biasing force of the first spring member, at a position at which the opening portion of the first oil passage is closed when the oil pump is stopped, and is displaced in a direction in which the opening portion of the first oil passage is open when a negative pressure is supplied by an operation of the oil pump.

3. The oil pressure supply device according to claim 2, wherein the second check valve is a flapper valve that includes a second valve body and a second spring member, the second valve body being movable forward and backward in an opening direction of an opening portion of the second oil passage and being configured to open and close the opening portion of the second oil passage, and the second spring member being configured to bias the second valve body in a direction in which the opening portion of the second oil passage is closed, and the second valve body is held, by a biasing force of the second spring member, at a position at which the opening portion of the second oil passage is closed when the oil pump is stopped, and is displaced in a direction in which the opening portion of the second oil passage is open when an oil pressure is supplied by the operation of the oil pump.

4. The oil pressure supply device according to claim 3, wherein when the oil pump is stopped, loads of the first spring member and the second spring member are set such that the second valve body closes the opening portion of the second oil passage earlier than the first valve body closes the opening portion of the first oil passage.

5. The oil pressure supply device according to claim 3, wherein the first valve body is made of a resin, and the second valve body is made of an aluminum alloy.

6. The oil pressure supply device according to claim 1, wherein the oil pump suctions oil from an oil reservoir, serving as the oil source, via a strainer that filters the oil, the strainer includes a connection port with the first oil passage, and the first check valve blocks communication between the first oil passage and the connection port when the oil pump is stopped.

7. The oil pressure supply device according to claim 1, wherein the pressure regulating circuit regulates the oil pressure by regulating a drain amount of the oil from the pressure regulating valve.

* * * * *